United States Patent
Perez Valencia et al.

(10) Patent No.: US 12,180,309 B2
(45) Date of Patent: Dec. 31, 2024

(54) MULTIMODAL POLYETHYLENE

(71) Applicant: SABIC GLOBAL TECHNOLOGIES B.V., Bergen op Zoom (NL)

(72) Inventors: Francisco Perez Valencia, Geleen (NL); Coen Hendriksen, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 520 days.

(21) Appl. No.: 17/622,232

(22) PCT Filed: Jun. 23, 2020

(86) PCT No.: PCT/EP2020/067399
§ 371 (c)(1),
(2) Date: Dec. 23, 2021

(87) PCT Pub. No.: WO2021/001200
PCT Pub. Date: Jan. 7, 2021

(65) Prior Publication Data
US 2022/0363787 A1    Nov. 17, 2022

(30) Foreign Application Priority Data

Jul. 4, 2019  (EP) .................... 19184489

(51) Int. Cl.
| | | |
|---|---|---|
| *C08L 23/06* | (2006.01) | |
| *C08F 10/02* | (2006.01) | |
| *C08F 210/16* | (2006.01) | |
| *C08F 110/02* | (2006.01) | |
| *C08L 23/08* | (2006.01) | |

(52) U.S. Cl.
CPC .............. *C08F 10/02* (2013.01); *C08L 23/06* (2013.01); *C08F 110/02* (2013.01); *C08F 210/16* (2013.01); *C08F 2500/05* (2013.01); *C08F 2500/07* (2013.01); *C08F 2500/17* (2013.01); *C08L 23/0815* (2013.01); *C08L 2205/025* (2013.01); *C08L 2207/062* (2013.01)

(58) Field of Classification Search
CPC ........... C08L 23/06; C08L 23/0815; C08L 2205/025; C08L 2207/062; C08F 110/02; C08F 210/02; C08F 210/16; C08F 2500/05; C08F 2500/07; C08F 2500/17
See application file for complete search history.

(56) References Cited

U.S. PATENT DOCUMENTS

| | | | |
|---|---|---|---|
| 6,342,622 B1 | 1/2002 | Arts et al. | |
| 7,153,909 B2 * | 12/2006 | Van Dun | C08L 23/0815 526/348 |
| 7,166,676 B2 * | 1/2007 | Jacobsen | C08F 210/16 525/240 |
| 9,493,589 B1 * | 11/2016 | Greco | B29C 49/0005 |
| 10,435,548 B2 * | 10/2019 | Garg | C08L 23/06 |
| 10,590,212 B2 * | 3/2020 | Doufas | C08F 210/16 |
| 10,696,826 B2 * | 6/2020 | Garg | C08F 210/16 |
| 11,254,809 B2 * | 2/2022 | Liu | C08L 23/16 |
| 11,345,799 B2 * | 5/2022 | Whited | A01G 25/02 |
| 11,427,670 B2 * | 8/2022 | Roos | C08F 210/16 |
| 12,049,527 B2 * | 7/2024 | Mure | C08F 4/65912 |
| 2008/0257854 A1 | 10/2008 | Stephenne et al. | |
| 2009/0253863 A1 | 10/2009 | Nord-Varhaug et al. | |
| 2021/0171749 A1 * | 6/2021 | Kumar | C08L 23/0815 |

FOREIGN PATENT DOCUMENTS

| | | |
|---|---|---|
| EP | 2182524 A1 | 5/2010 |
| WO | 0105852 A1 | 1/2001 |
| WO | 03093363 A1 | 11/2003 |
| WO | 2017009058 A1 | 1/2017 |
| WO | 2018095772 A2 | 5/2018 |
| WO | 2018185176 A1 | 10/2018 |

OTHER PUBLICATIONS

Bird et al.; "Dynamics of Polymeric Liquids; vol. 1: Fluid Mechanics"; John Wiley & Sons; 2nd Edition; 1987; 670 pages.
Hieber et al.; "Shear-Rate-Dependence Modeling of Polymer Melt Viscosity"; Polymer Engineering and Science, vol. 32, No. 14; 1992; pp. 931-938.
Hieber et al.; "Some Correlations Involving the Shear Viscosity of Polystyrene Melts"; Rheologica Acta, vol. 28, No. 4; 1989; pp. 321-332.
International Search Report for International Application No. PCT/EP2020/067399; International Filing Date Jun. 23, 2020; Date of Mailing Sep. 10, 2020; 5 pages.
Written Opinion for International Application No. PCT/EP2020/067399; International Filing Date Jun. 23, 2020; Date of Mailing Sep. 10, 2020; 6 pages.

* cited by examiner

*Primary Examiner* — Rip A Lee
(74) *Attorney, Agent, or Firm* — CANTOR COLBURN LLP

(57) ABSTRACT

The invention relates to an ethylene polymer comprising a low molecular weight component and a high molecular weight component, wherein—the ethylene polymer has a density of 955 to 977 kg/m³ and a viscosity value $\eta 100$ of at most 1500 Pa·s and a strain hardening as determined according to ISO18488 of at least 25 MPa, for example 30 to 40 MPa,—the amount of the low molecular weight component with respect to the total ethylene polymer is at least 60 wt %,—the low molecular weight component has a Mw of 10,000 to 50,000 g/mol, a ratio of Mw/Mn of 2.5 to 4.5 and a density of 965 to 985 kg/m³ and—the high molecular weight component has a Mw of 100,000 to 1,000,000, a ratio of Mw/Mn of 2.5 to 4.0 and a density of 920 to 950 kg/m³.

15 Claims, No Drawings

MULTIMODAL POLYETHYLENE

CROSS REFERENCE TO RELATED APPLICATIONS

This application is a National Stage application of PCT/EP2020/067399, filed Jun. 23, 2020, which claims the benefit of European Application No. 19184489.3, filed Jul. 4, 2019, both of which are incorporated by reference in their entirety herein.

The present invention relates to an ethylene polymer particularly suitable for blow molded articles, for example household and industrial containers. Furthermore, the present invention relates to a process for the production of said ethylene polymer, a blow molded article comprising said ethylene polymer and to the use of said ethylene polymer for the production of a blow molded article.

Compositions comprising an ethylene copolymer are used in many application fields for example in the production of pipes and films as well as in blow-molding and injection-molding applications. Blow molding and injection molding may be used to make a wide variety of articles. Blow molding is a molding process commonly used to produce for example household and industrial containers. In a blow molding process the polyethylene is melted and extruded into a mold and compressed air is used to inflate and shape the polymer into the desired form. The injection molding process may be applied to produce caps and closures for example for containers of bottled water, juices and carbonated soft drinks, and furthermore articles used in transportation packaging such as crates, boxes, bins, pallets, pails and trays. These molding techniques are also applied to produce articles for houseware applications and packaging articles. Important properties of the polymer to be molded are its mechanical properties which, in turn, determine the properties of the final molded article.

It is desirable for ethylene polymers for use in blow molding to have a high strain hardening. The ethylene polymer should also have flow properties which allow easy processing during the blow molding process.

U.S. Pat. No. 9,493,589 discloses blow moulded articles made from a bimodal ethylene copolymer comprising a high molecular weight component having a Mw of 1,000,000 to 1,500,000 g/mol and Mw/Mn of 1.8 to 2.7 and a low molecular weight component having a Mw of 50000 to 80000 g/mol and Mz/Mw of 1.6 to 2.5. The amount of the high molecular weight component is 12 to 26 wt %. The copolymer is made using a metallocene catalyst.

US20090253863 discloses a polyethylene composition for use in caps and closures, having a particular molecular weight distribution so that a specific relation between shear thinning index or spiral flow and melt flow rate of the composition is achieved.

The polyethylene composition comprises a first fraction of an ethylene homopolymer and a second fraction of an ethylene copolymer with 0.001 mol % to 1.5 mol % of an alpha-olefin comonomer, wherein the first fraction has a lower average molecular weight than the second fraction. The first fraction and the second fraction are obtained using a Ziegler-Natta catalyst.

US2008/0257854 discloses caps and closures for carbonated and still drinks prepared with bimodal HDPE. The bimodal HDPE is prepared with a catalyst system based on a bridged bisindenyl catalyst component. The amount of each fraction is not mentioned.

EP2182524 discloses a cable comprising a layer comprising a composition comprising a bimodal ethylene copolymer, wherein each fraction is made using a metallocene catalyst. The copolymer has a MFR2 of 0.1 to 5.0 g/10 min and an MFR5 of 0.05 to 10 g/10 min. In the example, the weight ratio between the low molecular weight component and the high molecular weight component was 50:50. The layer comprising said composition is applied on a conductor by (co)extrusion.

There is still a need for an ethylene polymer suitable for use in blow moulding, for example for making household and industrial containers, which provides a combination of superior flow properties which allow for easy processing and excellent mechanical properties such as high strain hardening, high impact strength and high stiffness.

Accordingly, the present invention provides an ethylene polymer comprising a low molecular weight component and a high molecular weight component, wherein the ethylene polymer has a density of 955 to 977 kg/m³ and a viscosity value $\eta_{100}$ of at most 1500 Pa·s and a strain hardening as determined according to ISO18488 of at least 25 MPa, for example 30 to 40 MPa, the amount of the low molecular weight component with respect to the total ethylene polymer is at least 60 wt %, the low molecular weight component has a Mw of 10,000 to 50,000 g/mol, a ratio of Mw/Mn of 2.5 to 4.5 and a density of 965 to 985 kg/m³ and the high molecular weight component has a Mw of 100,000 to 1,000,000 g/mol, a ratio of Mw/Mn of 2.5 to 4.0 and a density of 920 to 950 kg/m³.

It was surprisingly found that the ethylene polymer according to the invention has a high processability in combination with a high strain hardening, a high impact strength and a high stiffness.

The low viscosity value $\eta_{100}$ made possible by the high amount of the low molecular weight component leads to a high processability for blow molding of the ethylene polymer according to the invention. The ethylene polymer according to the invention is suitable for blow molding at a lower temperature and a lower cycle time and requires less energy. Due to the low Mw/Mn ratio of the low molecular weight component, the amount of the very low molecular weight fraction detrimental to the impact strength is small. This allows using a high amount of low molecular weight component without resulting in a low impact strength of the ethylene polymer according to the invention. The high amount of low molecular weight component also results in a high stiffness. The high molecular weight component leads to a high strain hardening of the ethylene polymer according to the invention. Further, the relatively high density of the ethylene polymer according to the invention allows for downgauging without the risk of deformation of the articles produced.

Ethylene Polymer

By ethylene polymer is meant a polymer the majority by weight of which derives from ethylene monomer units. The ethylene polymer may be an ethylene homopolymer or a copolymer of ethylene and a C3-C20 comonomer. The C3-C20 comonomer is preferably selected from the group consisting of C3-10 α-olefins such as propylene, 1-butene, 1-hexene and 1-octene. Most preferably, the ethylene polymer is a copolymer of ethylene and 1-hexene. For example, the amount of the comonomer units in the ethylene copolymer is 0.001 to 1.5 mol %, for example 0.1 to 1.0 mol %

The ethylene polymer according to the invention has a density of 955 to 977 kg/m³, preferably 956 to 960 kg/m³.

The ethylene polymer according to the invention has a relatively low viscosity at a relatively high shear rate, which results in a good processability for blow molding. The ethylene polymer according to the invention has a viscosity value $\eta_{100}$ of at most 1500 Pa·s. The viscosity value is calculated by fitting flow curves generated by oscillatory reometer according to ISO6721-10 with a modified Carreau-Yasuda model, which is represented by the following equation:

$$\eta = \eta_0 \cdot [1 + (\lambda \cdot \gamma)^a]^{\frac{n-1}{a}}$$

where $\eta$ is the viscosity in Pa·s $\eta_0$ is the zero shear viscosity (Pa·s)

a is the rheological breadth parameter n is the power law constant, set to 0 in the present case (defines the slope of the high shear rate region)

$\gamma$ is the shear rate (1/s)

$\lambda$ is the relaxation time (s)

$\eta_{5000}$ is the viscosity value in Pa·s at 190° C. and a shear rate of 5000 rad/s.

$\eta_{100}$ is the viscosity value in Pa·s at 190° C. and a shear rate of 100 rad/s.

$\eta_{0.01}$ is the viscosity value in Pa·s at 190° C. and a shear rate of 0.01 rad/s.

To facilitate model fitting, the power law constant is held at a constant value, in this case zero. Details of the significance and interpretation of the Carreau-Yasuda model and derived parameters may be found in: C. A. Hieber and H. H. Chiang, Rheol Acta, 28, 321 (1989); C. A. Hieber and H. H. Chiang, Polym. Eng. Sci., 32, 931 (1992); and R. B. Bird, R. C. Armstrong and O. Hasseger, Dynamics of Polymeric Liquids, Volume 1, Fluid Mechanics, $2^{nd}$ Edition, John Wiley & Sons (1987), each of which is incorporated by reference herein in its entirety.

Preferably, the ethylene polymer according to the invention has a viscosity value n0000 of at most 65 Pa·s, preferably at most 60 Pa·s, more preferably at most 55 Pa·s, for example 47 to 52 Pa·s.

The ethylene polymer according to the invention has a viscosity value $\eta_{100}$ of at most 1500 Pa·s, preferably at most 1450 Pa·s, more preferably at most 1400 Pa·s, for example 1200 to 1350 Pa·s.

Preferably, the ethylene polymer according to the invention has a viscosity value $\eta_{0.01}$ of at most 60000 Pa·s, preferably at most 50000 Pa·s, more preferably at most 45000 Pa·s, for example 40000 to 45000 Pa·s.

Shear thinning index (SHI) is a ratio of $\eta_{0.01}$ to $\eta_{100}$. High values of SHI are beneficial in that it means the viscosity is low at high shear rates where processability is important and the viscosity is high at low shear rates where dimension stability is important.

Preferably, the ethylene polymer according to the invention has a shear thinning index of at least 10, preferably at least 15, for example 20 to 35.

Preferably, the ethylene polymer according to the invention has a melt flow rate as measured according to ISO1133-1:2011 at 190° C. and 5kg of 0.1 to 4.0 dg/min, for example 0.5 to 2.0 dg/min.

The amount of the low molecular weight component with respect to the total ethylene polymer is at least 60 wt %, preferably 60 to 90 wt %, for example 65 to 75 wt %.

For example, the ethylene polymer according to the invention has a ratio of Mw/Mn of 10.0 to 20.0.

For example, the ethylene polymer according to the invention has Mw of 100,000 to 200,000 g/mol.

For example, the ethylene polymer according to the invention has Mn of 5,000 to 10,000 g/mol.

Preferably, the ethylene polymer according to the invention has a strain hardening as determined according to ISO18488 of at least 25 MPa, for example 27 to 40 MPa or 30 to 37 MPa.

Preferably, the ethylene polymer according to the invention has a Charpy impact strength (at −30° C.), measured according to ISO179-1, of at least 3.0 kJ/m², more preferably at least 4.0 kJ/m², more preferably at least 5.0 kJ/m².

Preferably, the ethylene polymer according to the invention has a tensile modulus, measured according to ISO527-2, of at least 1100 MPa, more preferably at least 1200 MPa, more preferably at least 1300 MPa and most preferably at least 1400 MPa. Typically, an upper limit for the tensile modulus is 1500 MPa. A typical range for the tensile modulus is 1200 to 1400 MPa.

Preferably, the ethylene polymer according to the invention has a crystallinity of 55 to 90%, for example 60 to 90% or 65 to 80%. Crystallinity is determined by differential scanning calorimetry (DSC) according to ASTM D-3417, using a sample of 5 mg, heating and cooling rates of 10° C./min and the second heating curve, using 288 J/g as the theoretical enthalpy for a 100% crystalline material.

Preferably, the crystalline melting point of the ethylene polymer according to the invention is between 125 and 140° C. as determined by DSC analysis as described above.

The ethylene polymer according to the invention is a multimodal ethylene polymer comprising at least the low molecular weight component and the high molecular weight component which have different molecular weights and molecular weight distributions, which have been prepared under different sets of conditions.

The form of the molecular weight distribution curve, i.e. the appearance of the graph of the polymer weight fraction as function of its molecular weight, of such a multimodal polyethylene will show two or more maxima or at least be distinctly broadened in comparison with the curves for the individual fractions.

For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

The ethylene polymer according to the invention may comprise ethylene polymer components other than the low molecular weight component and the high molecular weight component. Preferably however, ethylene polymer according to the invention does not comprise ethylene polymer components other than the low molecular weight component and the high molecular weight component. Preferably, the total of the low molecular weight component and the high molecular weight component is at least 80 wt %, preferably at least 90 wt %, at least 95 wt %, at least 98 wt %, at least 99 wt % or 100 wt % of the ethylene polymer according to the invention.

Low Molecular Weight Component

The low molecular weight component has a Mw of 10,000 to 50,000 g/mol, preferably 20,000 to 40,000 g/mol.

The low molecular weight component has a ratio of Mw/Mn of 2.5 to 4.5, preferably 3.0 to 4.2.

The low molecular weight component has a density of 965 to 977 kg/m³, preferably 970 to 976 kg/m³ or 975 to 976 kg/m³.

Preferably, the low molecular weight component has a melt flow rate as measured according to ISO1133-1:2011 at 190° C. and 1.2 kg of 50 to 500 dg/min.

Preferably, the amount of the very low molecular weight fraction in the low molecular weight component is low. Accordingly, preferably, the amount of a polymer fraction having a Mw of less than 2,500 g/mol is at most 4.2 wt % with respect to the ethylene polymer. This is advantageous for a high impact strength.

The low molecular weight component may be an ethylene homopolymer or a copolymer of ethylene and a C3-C20 comonomer. The C3-C20 comonomer is preferably selected from the group consisting of C3-10 α-olefins such as propylene, 1-butene, 1-hexene and 1-octene. Preferably, the low molecular weight component is an ethylene homopolymer. When the low molecular weight component is a copolymer, the amount of the comonomer units in the low molecular weight component is preferably 0.001 to 1.5 mol %, for example 0.01 to 0.1 mol %.

High Molecular Weight Component

The high molecular weight component has a Mw of 100,000 to 1,000,000 g/mol, preferably 120,000 to 500,000 g/mol, more preferably 210,000 to 450,000 g/mol, most preferably 300,000 to 400,000 g/mol.

The high molecular weight component has a ratio of Mw/Mn of 2.5 to 4.0, for example 3.0 to 3.5.

The high molecular weight component has a density of 920 to 950 kg/m³, preferably 920 to 930 kg/m³.

Preferably, the high molecular weight component has a melt flow rate as measured according to ISO1133-1:2011 at 190° C. and 21.6 kg of 0.05 to 2.0 dg/min, 0.08 to 1.0 dg/min or 0.10 to 0.05 dg/min.

Preferably, the amount of the very high molecular weight fraction in the high molecular weight component is low. Accordingly, preferably, the amount of a polymer fraction having a Mw of higher than 750,000 is at most 5.0 wt % with respect to the ethylene polymer. This is advantageous in that the amount of very high molecular weight fraction polymer chains, which causes article defects due to poor processing performance, is small.

The high molecular weight component may be an ethylene homopolymer or a copolymer of ethylene and a C3-C20 comonomer. The C3-C20 comonomer is preferably selected from the group consisting of C3-10 α-olefins such as propylene, 1-butene, 1-hexene and 1-octene. Preferably, the high molecular weight component is a copolymer of ethylene and a C3-C20 comonomer. Preferably, the amount of the comonomer units in the high molecular weight component is 0.001 to 1.5 mol %, for example 0.1 to 1.0 mol %.

Process for Preparation of Ethylene Polymer

The ethylene polymer according to the invention may be prepared by a process comprising producing the low molecular weight component and the high molecular weight component as a bimodal ethylene polymer made by polymerizing the low molecular weight component (high molecular weight component) and subsequently polymerizing the high molecular weight component (low molecular weight component) in the presence of the low molecular weight component (high molecular weight component). Accordingly, the invention provides a process for the preparation of the ethylene polymer according to the invention, wherein the process comprises a sequential polymerization process comprising at least two reactors connected in series, wherein said process comprises the steps of preparing the low molecular weight component (high molecular weight component) in a first reactor using the first set of conditions, transferring said low molecular weight component (high molecular weight component) and unreacted monomers of the first reactor to a second reactor, feeding monomers to said second reactor, preparing the high molecular weight component (low molecular weight component) in said second reactor in the presence of said low molecular weight component (high molecular weight component) to obtain the ethylene polymer.

In such a case, the properties of the fractions produced in the second reactor can either be inferred from polymers, which are separately produced in a single stage by applying identical polymerisation conditions (e.g. identical temperature, partial pressures of the reactants/diluents, suspension medium, reaction time) with regard to the stage of the multistage process in which the fraction is produced, and by using a catalyst on which no previously produced polymer is present. Alternatively, the properties of the fractions produced in a higher stage of the multistage process may also be calculated, e.g. in accordance with B. Hagström, Conference on Polymer Processing (The Polymer Processing Society), Extended Abstracts and Final Programme, Gothenburg, Aug. 19 to 21, 1997, 4:13.

Thus, although not directly measurable on the multistage process products, the properties of the fractions produced in higher stages of such a multistage process can be determined by applying either or both of the above methods. The skilled person will be able to select the appropriate method.

Alternatively, the ethylene polymer according to the invention may be prepared by a process comprising melt-mixing or solution blending the low molecular weight component and the high molecular weight component made in different reactors to obtain the ethylene polymer. The melt-mixing or solution blending may be carried out in any conventional blending apparatus. The low molecular weight component and the high molecular weight component to be melt-mixed or solution blended may be produced by any known process.

Catalyst

The low molecular weight component and the high molecular weight component are made using a metallocene catalyst. This results in the low ratio of Mw/Mn.

Metallocene catalysts are per se well-known and are described e.g. in EP2182524A1 [0049]-[0056].

Examples of the suitable metallocene catalysts for preparing the low molecular weight component include the indenyl compounds (1) and (2) described in U.S. Pat. No. 6,342,622: Indenyl compound of formula (1) wherein:

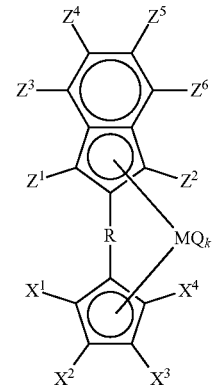

M is a transition metal from the lanthanides or from group 3, 4, 5 or 6 of the Periodic System of Elements, Q is an anionic ligand to M, k is the number of Q groups and is equal to the valence of M minus 2, R is a bridging group and Z and X are substituents, characterised in that R contains at least one sp2-hybridised carbon atom that is bonded to the indenyl group at the 2-position with the exclusion of Ti(deshydronorbiphenacene) dichloride.

Indenyl compound of formula (2) wherein:

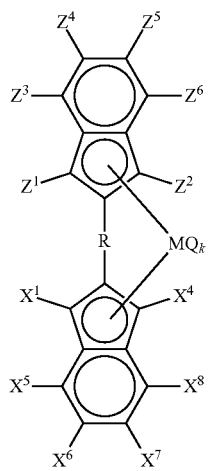

M is a transition metal from the lanthanides or from group 3, 4, 5 or 6 of the Periodic System of Elements, Q is an anionic ligand to M, k is the number of Q groups and is equal to the valence of M minus 2, R is a bridging group and Z and X are substituents, characterised in that R contains at least one sp2-hybridised carbon atom that is bonded to one of the indenyl groups at the 2-position with the exclusion of Ti(deshydronorbiphenacene)dichloride.

Examples of the suitable metallocene catalysts for preparing the high molecular weight component include the complex (I) described in WO2018185176A1:

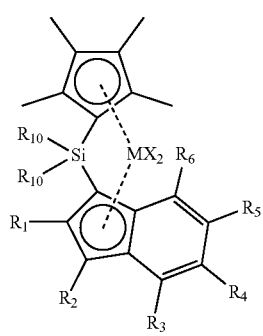

wherein $R_1$ is selected from C2-C10 alkyl, preferably C3-C10 alkyl, C6-C20 aryl, C7-C20 aralkyl groups, wherein $R_2$ is selected from H, C1-C10 alkyl, and wherein $R_3$, $R_4$, $R_5$ and $R_6$ are independently selected from H, C1-C10 alkyl, C6-C20 aryl, or C7-C20 aralkyl groups and wherein $R_3$ and $R_4$, $R_4$ and $R_5$, or $R_5$ and $R_6$ can be connected to form a ring structure, wherein each $R_{10}$ is a hydrocarbyl group, preferably a C1-C4 alkyl group, wherein M is selected from Ti, Zr and Hf, X is an anionic ligand to M.

FURTHER ASPECTS

The present invention further relates to a composition comprising the ethylene polymer according to the invention. The composition may consist of the ethylene polymer according to the invention and additives such as pigments, nucleating agents, antistatic agents, fillers, antioxidants etc. The amount of the additives in the composition is generally up to 10% by weight, preferably 0.1 to 5% by weight of the composition.

The present invention further relates to an article comprising the ethylene polymer according to the invention or the composition according to the invention. Preferably, the article is a blow molded article.

The article may be household and industrial containers for example containers of bottled water, juices and carbonated soft drinks, and furthermore articles used in transportation packaging such as crates, boxes, bins, pallets, pails and trays.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

Measurement Methods

Molecular Weight

Mw, Mn and Mz were measured in accordance with ASTM D6474-12 (Standard Test Method for Determining molecular weight distribution and molecular weight Averages of Polyolefins by High Temperature Gel Permeation Chromatography). Mw stands for the weight average molecular weight and Mn stands for the number average molecular weight. Mz stands for the z-average molecular weight. MWD stands for Mw/Mn.

A high-temperature chromatograph Polymer Char GPC-IR system equipped with IR5 MCT detector and Polymer Char viscometer (Polymer Char S.A., Spain) was used at 160° C. to determine the MWD and SCB as function of molecular weight. Three columns of Polymer Laboratories 13 μm PLgel Olexis, 300×7.5mm, were used in series for GPC separation. 1,2,4-trichlorobenzene stabilized with 1 g/L butylhydroxytoluene (also known as 2,6-di-tert-butyl-4-methylphenol or BHT) was used as eluent at a flow rate of 1 mL/min. Sample concentration was around 0.7 mg/mL and injection volume was 300 μL. The molar mass was determined based on the Universal GPC-principle using a calibration made with PE narrow and broad standards (in the range of 0.5-2800 kg/mol, Mw/Mn—4 to 15) in combination with known Mark Houwink constants of PE-calibrant (alfa=0.725 and log K=−3.721).

Density

All densities were measured according to ISO 1183/D.

Melt Flow Rate

The melt flow rate (MFR) was determined according to ISO 1133-1:2011 at the temperature of 190° C. and the load indicated by the numeral (MRF1.2 load of 1.2 kg, MFR2.16 load of 2.16 kg, MFRS load of 5 kg, MFR21.6 load of 21.6 kg).

Charpy Impact

Charpy impact strength was determined according to ISO 179:2000 on V-notched samples at −30° C.

Strain Hardening

Strain hardening was determined according to ISO18488.

Viscosity

The viscosity value is calculated by fitting flow curves generated by oscillatory reometer according to ISO6721-10 with a modified Carreau-Yasuda model, which is represented by the following equation:

$$\eta = \eta_0 \cdot [1 + (\lambda \cdot \gamma)^a]^{\frac{n-1}{a}}$$

where

η is the viscosity in Pa·s $\eta_0$ is the zero shear viscosity (Pa·s)

a is the rheological breadth parameter n is the power law constant, set to 0 in the present case (defines the slope of the high shear rate region)

γ is the shear rate (1/s)

λ is the relaxation time (s)

$\eta_{5000}$ is the viscosity value in Pa·s at 190° C. and a shear rate of 5000 rad/s.

$\eta_{100}$ is the viscosity value in Pa·s at 190° C. and a shear rate of 100 rad/s.

$\eta_{0.01}$ is the viscosity value in Pa·s at 190° C. and a shear rate of 0.01 rad/s.

To facilitate model fitting, the power law constant is held at a constant value, in this case zero. Details of the significance and interpretation of the Carreau-Yasuda model and derived parameters may be found in: C. A. Hieber and H. H. Chiang, Rheol Acta, 28, 321 (1989); C. A. Hieber and H. H. Chiang, Polym. Eng. Sci., 32, 931 (1992); and R. B. Bird, R. C. Armstrong and O. Hasseger, Dynamics of Polymeric Liquids, Volume 1, Fluid Mechanics, $2^{nd}$ Edition, John Wiley & Sons (1987), each of which is incorporated by reference herein in its entirety.

Melting point (Tm), crystallization temperature (Tc), degree of crystallinity Differential scanning calorimetry (DSC) was performed according to ASTM D-3417, using a sample of 5 mg, heating and cooling rates of 10° C./min and the second heating curve. A theoretical standard of 288 J/g was used for a 100% crystalline material.

Experiments 1 and 2

Preparation of Supported Metallocene Compound I

Supported catalyst I was produced using compound III (111.5) as described in U.S. Pat. No. 6,342,622. In a vial 0.244 mmol of the compound III was suspended in 7.6 mL toluene and subsequently 7.6 mL MAO (30 wt %) is added. The suspension was stirred for 15 minutes at room temperature to give a clear solution. The solution was transferred to a round bottomed flask and the vial was washed with 2×4 mL toluene. 5 g ES7575 silica was added to the solution to form a slurry. The solvent was removed at room temperature by flushing the flask with nitrogen for 20 h to give a free-flowing powder of supported catalyst I.

Preparation of Low Molecular Weight Component 1 and 2

An ethylene homopolymer polymer was prepared by using the supported compound III. The polymerizations were carried out in a 5 L bench scale batch reactor. The reactor operates under slurry conditions using isobutane as diluent. The 5 liter reactor was filled to 65% of its volume with diluent prior to each experiment. Statsafe (Innospec) was used as anti-fouling agent and triisobutylaluminum was used as scavenger. The temperature of the reactor was kept as constant as possible by a thermostat bath.

About 100 mg of the supported compound III was then injected into the reactor, and constant ethylene pressure was maintained. The ethylene pressure was 5 mol % and 10 mol % for the preparation of the low molecular weight component 1 and 2, respectively. After 1 hour of reaction time, the polymers were collected and dried in the vacuum oven (60° C., overnight) before the further analysis. Properties of the obtained ethylene homopolymer are shown in Table 1.

Preparation of Supported Metallocene Compound II

Supported catalyst II was produced using compound Cat143 as described in WO2018/185176. In a vial 0.244 mmol of Cat143 is suspended in 7.6 mL of toluene and subsequently 7.6 mL MAO (30 wt %) is added. The suspension was stirred for 15 minutes at room temperature to give a clear solution. The solution was transferred to a round bottomed flask and the vial is washed with 2×4 mL toluene. 5 g ES7575 silica was added to the solution to form a slurry. The solvent was removed at room temperature by flushing the flask with nitrogen for 20 h to give a free flowing powder of supported catalyst II.

Preparation of High Molecular Weight Component

A copolymer of ethylene and 1-hexene was prepared in the same experimental set up used for the preparation of the low molecular weight component. The same polymerization protocols were used except that specific amount of 1-hexene was fed into the reactor prior to the ethylene feed and Cat143 was used instead. After 1 hour of reaction time, the polymers were collected and dried in the vacuum oven (60° C., overnight) before the further analysis. Properties of the obtained ethylene copolymer are shown in Table 1.

TABLE 1

| | Mw (kDa) | MWD | Density (kg/m$^3$) | MFR1.2 (g/10 min) | MFR21.6 (g/10 min) |
|---|---|---|---|---|---|
| LMW component 1 | 23 | 3.6 | >970 | 282 | |
| LMW component 2 | 26 | 3.7 | >970 | 72.5 | |
| HMW component | 350 | 3.1 | 924 | | 0.14 |

Ethylene Copolymer

The ethylene homopolymer (low molecular weight component 1 or 2) and the ethylene copolymer (high molecular weight component) obtained as above were mixed by solution blending at a weight ratio of 65:35.

Comparative Experiments 1, 2 and 3

A bimodal ethylene-1-hexene copolymer was prepared using the catalyst described in WO2017009058, p. 9, l.28-p. 10, l.4.

The polymerization was carried out in a continuous installation consisting of 2 equally sized CSTR polymerization reactors in series using a mixture of C7 hydrocarbons as the diluent. The reactors contain a headspace wherein the composition is continuously analyzed using an online analyzer. In the first reactor, a lower molecular weight ethylene homopolymer is produced, followed by the production of a high molecular weight ethylene-1-hexene copolymer.

Between the first reactor and the second reactor, a flash step is applied, primarily aimed at removing the hydrogen coming out from the first reactor by means of reducing the pressure.

The production rate of the pilot plant was 0.7 kg/h of polymer, with the proportion of polymer made in the 1$^{st}$ reactor (split; in weight percent with respect to the total polymer) as shown in the table 2. The obtained polyethylene was pelletised in a twin screw extruder with 3000 ppm of a mixture of Calcium Stearate, Irganox 168 and Irgafos 1010 in the weight proportion of 50:37.5:12.5 respectively.

TABLE 2

| Example | CompEx1 | CompEx2 | CompEx3 |
|---|---|---|---|
| H2/C2 (mol/mol) headspace Reactor 1 | 3.59 | 3.59 | 3.55 |
| C6/C2 (mol/mol) headspace Reactor 1 | 0 | 0 | 0 |
| Temperature Reactor 1 (° C.) | 88 | 88 | 88 |
| MI1.2 powder Reactor 1 (g/10 min) | 48.8 | 48.2 | 46.9 |
| H2/C2 mol/mol headspace Reactor 2 | 0.206 | 0.172 | 0.104 |
| C6/C2 mol/mol headspace Reactor 2 | 0.005 | 0.005 | 0.006 |
| Temperature Reactor 2 (° C.) | 78 | 78 | 78 |
| Split Reactor 1 (wt %) | 53.4 | 52.7 | 51 |
| MI5 (g/10 min) (pellets) | 1.04 | 0.67 | 0.22 |
| Density (kg/m3) (pellets) | 959.8 | 958.8 | 957.5 |

Properties of the ethylene polymers of experiments 1-2 and comparative experiments 1-3 are shown in Table 3. Ex 1 is a blend of LMW component 1 and the HMW component. Ex2 is a blend of LMW component 2 and the HMW component. Some properties were also measured for a commercial grade SABIC BI5828 which is a bimodal ethylene-1-butene copolymer made using a Ziegler-Natta catalyst a commercial grade ACP5831 D from LyondellBasell which is a trimodal ethylene-1-butene copolymer made using a Ziegler Natta catalyst, also shown in Table 3.

TABLE 3

| | LMW content (wt %) | Density (kg/m$^3$) | MFR5 (g/10 min) | η5000 (Pa · s) | η100 (Pa · s) | η0.01 (Pa · s) | Shear thinning index (0.01/100) | Mn (kDa) | Mw (kDa) | Mz (kDa) | Mw/Mn |
|---|---|---|---|---|---|---|---|---|---|---|---|
| Ex 1 | 65 LMW 1 | 957.7 | 1.42 | 48.8 | 1318 | 42610 | 32.3 | 7.9 | 145 | 730 | 18.3 |
| Ex 2 | 65 LMW2 | 957.3 | 1.29 | 51.7 | 1375 | 43687 | 31.8 | 9.3 | 150 | 730 | 15.9 |
| BI5828 | — | 957.6 | 1.17 | | 1724 | 53796 | 31.2 | | | | |
| ACP5831D | — | 955.4 | 1.25 | | 1631 | 56728 | 34.8 | | | | |
| CompEx1 | 53.4 | 959.8 | 1.04 | 103.4 | 1708 | 66088 | 38.7 | | | | |
| CompEx2 | 52.7 | 958.8 | 0.67 | | 1875 | | | | | | |
| CompEx3 | 51 | 957.5 | 0.22 | | 2825 | | | | | | |

| | Strain hardening (MPa) | Charpy at −30° C. (kJ/m2) | Tm (° C.) | Tc (° C.) | Degree of crystallinity (%) |
|---|---|---|---|---|---|
| Ex 1 | 33.4 | 5.5 | 128.58 | 117.94 | 69.58 |
| Ex 2 | 33.9 | 6 | 129.41 | 117.81 | 78.09 |
| BI5828 | 16.9 | | | | |
| ACP5831D | 19.6 | 5.6 | | | |
| CompEx1 | 16.4 | 4.4 | | | |
| CompEx2 | 19.1 | 4.6 | | | |
| CompEx3 | 29.9 | | | | |

The ethylene copolymer of Ex 1 and 2 has a combination of a very high strain hardening, high density and a good processability for blow molding (low η100), while retaining good impact resistance. Such a combination of properties is not seen with the ethylene copolymers of comparative experiments. BI5828, ACP5831 D, CompEx1 and CompEx2 have lower strain hardening and higher η100. CompEx3, with same type of comonomer as Ex 1 and 2, comparable density and much lower MI5 still shows lower strain hardening than Ex 1 and 2 and η100 is too high to be easily processable for blow molding.

The invention claimed is:

1. An ethylene polymer comprising a low molecular weight component and a high molecular weight component, wherein the ethylene polymer has a density of 955 to 977 kg/m$^3$ and a viscosity value $\eta_{100}$ of at most 1500 Pa·s and a strain hardening as determined according to ISO18488 of at least 25 MPa, an amount of the low molecular weight component with respect to total ethylene polymer is at least 60 wt %, the low molecular weight component has a Mw of 10,000 to 50,000 g/mol, a ratio of Mw/Mn of 2.5 to 4.5 and a density of 965 to 985 kg/m$^3$ and the high molecular weight component has a Mw of 100,000 to 1,000,000 g/mol, a ratio of Mw/Mn of 2.5 to 4.0 and a density of 920 to 950 kg/m$^3$.

2. The ethylene polymer according to claim 1, wherein the ethylene polymer is an ethylene homopolymer or a copolymer of ethylene and at least one C3-C20 α-olefins.

3. The ethylene polymer according to claim 1, wherein the ethylene polymer has a viscosity value $\eta_{100}$ of at most 1450 Pa·s.

4. The ethylene polymer according to claim 1, wherein the ethylene polymer has a shear thinning index $\eta_{100}$ to $\eta_{0.01}$ of at least 10.

5. The ethylene polymer according to claim 1, wherein the ethylene polymer has a melt flow rate as measured according to ISO1133-1:2011 at 190° C. and 5 kg of 1.0 to 20 dg/min.

6. The ethylene polymer according to claim 1, wherein the amount of the low molecular weight component with respect to the total ethylene polymer is 60 to 90 wt %.

7. The ethylene polymer according to claim 1, wherein the ethylene polymer has has a Charpy impact strength, measured according to ISO179-1 at −30° C., of at least 4.0 KJ/m$^2$ and/or a tensile modulus, measured according to ISO527-2/1BA/50, of at least 1100 MPa.

8. The ethylene polymer according to claim 1, wherein the low molecular weight component is an ethylene homopolymer.

9. The ethylene polymer according to claim 1, wherein an amount of a polymer fraction having a Mw of less than 2,500 g/mol is at most 4.2 wt % with respect to the ethylene polymer.

10. The ethylene polymer according to claim 1, wherein the high molecular weight component is a copolymer of ethylene and at least one C3-C20 α-olefins wherein an amount of the at least one C3-C20 α-olefins in the copolymer is 0.001 mol % to 1.5 mol %.

11. The ethylene polymer according to claim 1, wherein the high molecular weight component has a Mw of 200,000 to 400,000 g/mol and/or a melt flow rate as measured according to ISO1133-1:2011 at 190° C. and 21.6 kg of 0.10 to 1.00 g/10 min.

12. A process for preparing the ethylene polymer according to claim 1, comprising the steps of
   i) polymerizing ethylene monomer and optionally one or more alpha-olefin comonomers in the presence of a metallocene catalyst to obtain the low molecular weight component and
   ii) polymerizing ethylene monomer, and optionally one or more alpha-olefin comonomers in the presence of a metallocene catalyst to obtain the high molecular weight component.

13. The process according to claim 11, wherein step i) and step ii) are performed in cascaded reactors or the process comprises melt-mixing or solution blending the low molecular weight component and the high molecular weight component made in different reactors.

14. A composition comprising the ethylene polymer according to claim 1 and additives.

15. An article or a blow molded article comprising the ethylene polymer according to claim 1.

* * * * *